United States Patent
Fukushima et al.

(10) Patent No.: US 10,122,005 B2
(45) Date of Patent: Nov. 6, 2018

(54) WIRING MODULE AND METHOD FOR PRODUCING WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Mitsutoshi Morita, Mie (JP); Osamu Nakayama, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/507,511

(22) PCT Filed: Aug. 25, 2015

(86) PCT No.: PCT/JP2015/073777
§ 371 (c)(1),
(2) Date: Feb. 28, 2017

(87) PCT Pub. No.: WO2016/035601
PCT Pub. Date: Mar. 10, 2016

(65) Prior Publication Data
US 2017/0294640 A1  Oct. 12, 2017

(30) Foreign Application Priority Data
Sep. 1, 2014 (JP) .................... 2014-177104

(51) Int. Cl.
*H01M 2/10* (2006.01)
*H01M 2/20* (2006.01)
(Continued)

(52) U.S. Cl.
CPC .......... *H01M 2/206* (2013.01); *H01M 2/1077* (2013.01); *H01M 2/24* (2013.01);
(Continued)

(58) Field of Classification Search
CPC ...... H01M 2/1077; H01M 2/206; H01M 2/24; H01M 10/482; H01M 2220/20; H01R 25/162; H01R 43/16
See application file for complete search history.

(56) References Cited

U.S. PATENT DOCUMENTS

2012/0328920 A1  12/2012  Takase et al.
2013/0010449 A1  1/2013  Ikeda et al.

FOREIGN PATENT DOCUMENTS

JP  2011-008955  1/2011
JP  2011-210710  * 10/2011
(Continued)

OTHER PUBLICATIONS

English translation of JP Publication 2011-210710, Oct. 2011.*
Search Report issued in International Bureau of WIPO Patent Application No. PCT/JP2015/073777, dated Nov. 17, 2015.

*Primary Examiner* — Brittany L Raymond
(74) *Attorney, Agent, or Firm* — Greenblum & Bernstein, P.L.C.

(57) ABSTRACT

A wiring module is for attachment to a power storage element group in which multiple power storage elements are arranged in a line. The wiring module includes an insulating protector having an electrical wire holding portion that holds electrical wires that detect the state of the power storage elements, and a bending member that is provided at a (Continued)

position connected to the electrical wire holding portion, and has a hinge that is bent in a direction that intersects the electrical wire holding portion. The electrical wires are fixed to the bending member. The bending member has a locked portion that is locked to the insulating protector in a state of being bent by the hinge.

7 Claims, 8 Drawing Sheets

(51) Int. Cl.
    *H01M 2/24*         (2006.01)
    *H01M 10/48*      (2006.01)
    *H01R 25/16*      (2006.01)
    *H01R 43/16*      (2006.01)

(52) U.S. Cl.
    CPC ........ *H01M 10/482* (2013.01); *H01R 25/162* (2013.01); *H01R 43/16* (2013.01); *H01M 2220/20* (2013.01)

(56) References Cited

FOREIGN PATENT DOCUMENTS

| | | |
|---|---|---|
| JP | 2012-243648 | 12/2012 |
| JP | 2013-017332 | 1/2013 |
| JP | 2013-161749 | 8/2013 |
| JP | 2014-233160 | 12/2014 |

\* cited by examiner

WIRING MODULE AND METHOD FOR PRODUCING WIRING MODULE

TECHNICAL FIELD

The present invention relates to a wiring module and a method for producing the wiring module.

BACKGROUND ART

Battery modules for installation in electric automobiles, hybrid vehicle, and the like are generally constituted by connecting many electric cells in series via a connection member. This type of battery module needs to be provided with electrical wires for detecting the state (voltage, temperature, etc.) of the electric cell group.

One known example of this battery module is assembled by attaching a wiring module, which includes connection members and electrical wires, to an electric cell group in which multiple electric cells are arranged in a line (e.g., see Patent Document 1).

CITATION LIST

Patent Documents

Patent Document 1: JP 2011-8955A

SUMMARY OF INVENTION

Technical Problem

The battery connection assembly (wiring module) described in Patent Document 1 includes multiple connection members that are held at predetermined positions in a connection unit, and multiple electrical wires, and the electrical wires are collectively housed in an electrical wire housing groove provided in the connection unit.

The electrical wires for detecting the state of the electric cell group are connected to an external device such as a battery control unit, and there are cases where, depending on the positional relationship between the electric cell group and the external device, the routing path of the electrical wires bends and changes in direction. There is demand for an improvement in workability in assembly work in such cases as well.

An object of the present invention is to provide a wiring module having improved workability in assembly work.

Solution to Problem

A wiring module of the present invention is for attachment to a power storage element group in which multiple power storage elements are arranged in a line, the wiring module including: an insulating protector having an electrical wire holding portion that holds an electrical wire that detects a state of the power storage elements; and a bending member that is provided at a position connected to the electrical wire holding portion, and has a bending portion that is bent in a direction that intersects the electrical wire holding portion, the electrical wires being fixed to the bending member, wherein the bending member has a locked portion that is locked to the insulating protector in a state of being bent by the bending portion.

Also, a wiring module production method of the present invention is a method for producing a wiring module for attachment to a power storage element group in which multiple power storage elements are arranged in a line, the wiring module including an insulating protector having an electrical wire holding portion that holds an electrical wire that detects a state of the power storage elements, and a bending member that is provided at a position connected to the electrical wire holding portion, and has a bending portion that is bent in a direction that intersects the electrical wire holding portion, the electrical wires being fixed to the bending member, the method including: executing a fixing step of fixing the electrical wire held in the electrical wire holding portion to the bending member; thereafter executing a bending step of bending the bending portion; and executing a locking step of locking the bending member to the insulating protector, the bending member being in a bent state due to executing the bending step.

In the present invention, the wiring module has the insulating protector that has the electrical wire holding portion, and the bending member that is provided at a position connected to the electrical wire holding portion. In the present invention, the electrical wire held in the electrical wire holding portion is fixed to the bending member, and the bending member with the electrical wire fixed thereto is bent at the bending portion so as to be in the bent state and be locked to the insulating protector.

In other words, in the present invention, by merely fixing the electrical wire, which is held in the electrical wire holding portion, to the bending member, and then bending the bending portion of the bending member, it is possible to change the routing direction of the electrical wire to a direction that intersects the direction in which it is routed in the electrical wire holding portion, and therefore it is possible to smoothly perform assembly work even in the case where the routing direction of the electrical wire need to be changed. As a result, according to the present invention, it is possible to provide the wiring module having improved workability in assembly work.

The present invention may have configurations such as the following.

The bending member and the insulating protector may be an integrated body. According to this configuration, the bending member and the insulating protector can be formed at the same time, and it is possible to simplify the production processing.

The bending member may include a fixing portion that fixes the electrical wire to the bending member. According to this configuration, the electrical wire can be fixed to the bending member by the fixing portion, thus achieving superior work efficiency.

Advantageous Effects of Invention

According to the present invention, it is possible to provide a wiring module having improved workability in assembly work.

DESCRIPTION OF EMBODIMENTS

First Embodiment

A first embodiment of the present invention will be described below with reference to FIGS. 1 to 8.

Figure 1:
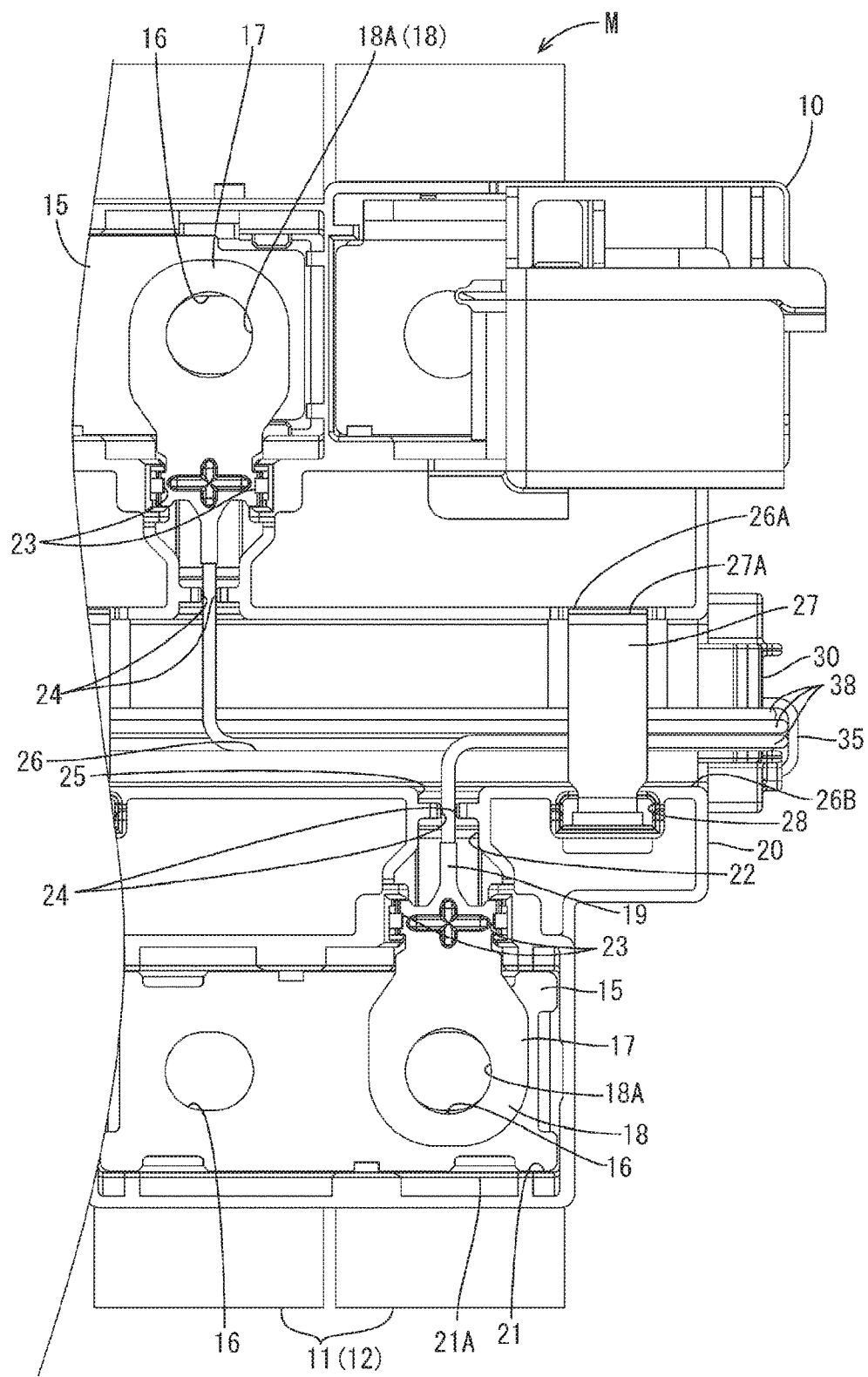
FIG. 1 is a partial plan view of a power storage module that includes a wiring module according to a first embodiment.

As shown in FIG. 1, a wiring module 10 according to the present embodiment is attached to a power storage element group 12 in which multiple power storage elements 11 are arranged in a line, thus constituting a power storage module M. The power storage module M is for installation in a vehicle (not shown) such as an electric automobile or a hybrid automobile, and is used as a motive power source for driving the vehicle.

Figure 2:
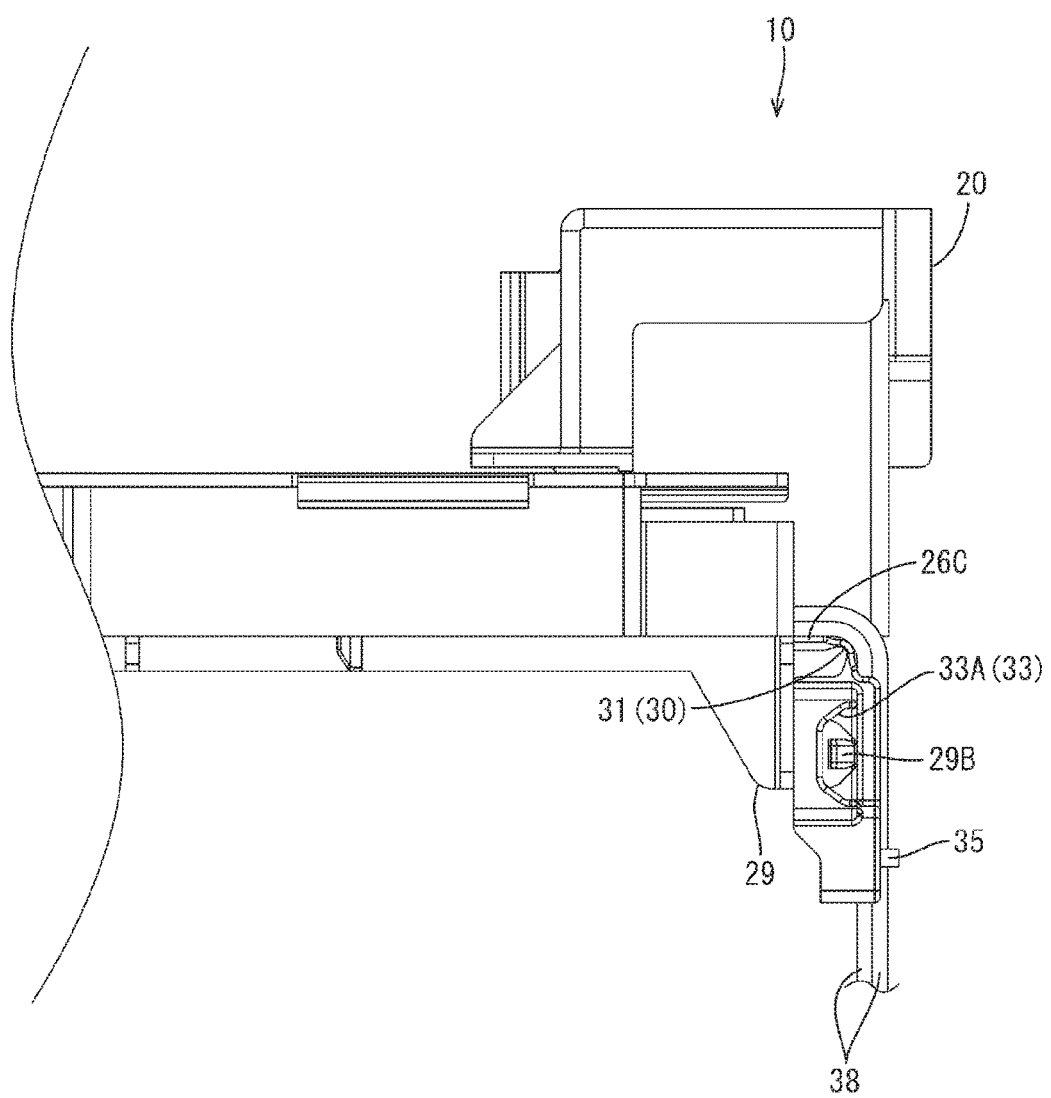
FIG. 2 is a partial front view of the wiring module.
Figure 3:
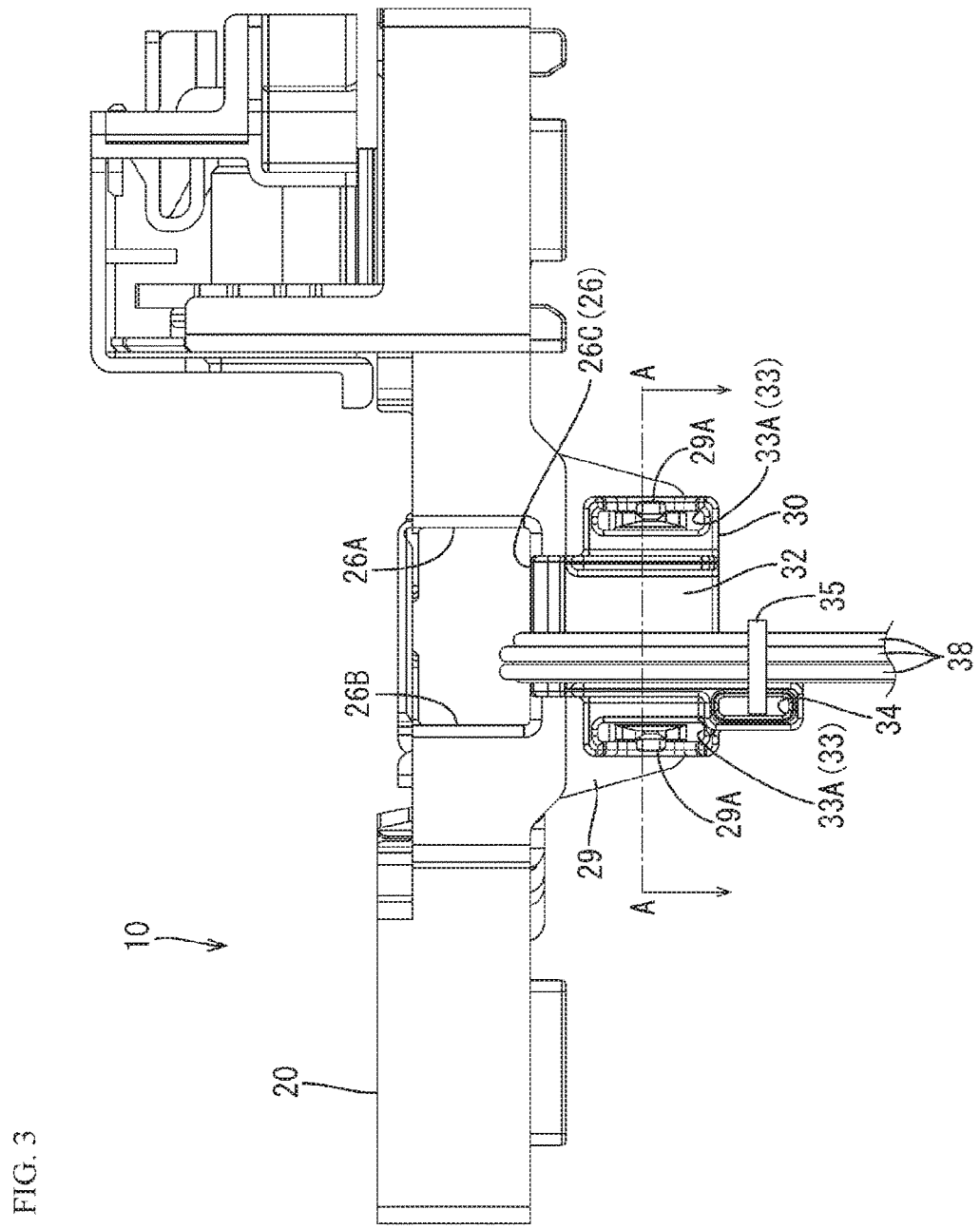
FIG. 3 is a partial side view of the wiring module.

In the following description, the downward direction in FIG. 1 is considered to be the forward direction, and the upward direction is considered to be the rearward direction. Also, the upward direction in FIGS. 2 and 3 is considered to be the upward direction, and the downward direction is considered to be the downward direction. Also, in the following description, when there are multiple members that are the same, there are cases where one member is denoted by a reference sign, and the other members are not denoted by reference signs.

Power Storage Element 11

The power storage elements 11 of the present embodiment are secondary cells. Power storage components (not shown) are housed inside the power storage elements 11. The power storage elements 11 have an approximately cuboid shape. A pair of electrode terminals are formed on the upper surface of each of the power storage elements 11, at positions toward the two end portions in the front-rear direction. One of the electrode terminals is a positive terminal, and the other is a negative terminal. The power storage elements 11 are arranged such that adjacent electrode terminals have different polarities. Multiple power storage elements 11 are arranged in a line in the left-right direction in FIG. 1 to constitute the power storage element group 12.

Wiring Module 10

The wiring module 10 is attached to the upper surface of the power storage element group 12. The wiring module 10 is shaped to be elongated in the left-right direction.

As shown in FIG. 1, the wiring module 10 includes an insulating protector 20, multiple bus bars 15 that are housed in the insulating protector 20, detection terminals 17 that detect the state of the power storage elements 11, and electrical wires 38 that are connected to the detection terminals 17 (one example of an electrical wire that detects the state of a power storage element).

Insulating Protector 20

The insulating protector 20 is made of an insulating material (insulating synthetic resin). In the insulating protector 20, bus bar housing portions 21 that house the bus bars 15 are formed in two lines extending in the left-right direction in FIG. 1. The insulating protector 20 has an electrical wire holding portion 26 for holding the electrical wires 38 between the two lines of bus bar housing portions 21. Terminal holding portions 22, each of which holds a connection portion that connects a detection terminal 17 to an electrical wire 38, are provided between the electrical wire holding portion 26 and each of the two lines of bus bar housing portions 21.

As shown in FIG. 1, each bus bar housing portion 21 is shaped approximately as a rectangle that is elongated in the left-right direction when viewed from above, and is somewhat larger than the bus bar 15. The bus bar housing portion 21 has a peripheral wall 21A that surrounds the periphery of the bus bar 15. The bus bar housing portion 21 is open upward, and a bus bar 15 and a detection terminal 17 can be placed inside the bus bar housing portion 21 from above.

An opening is formed in a portion of the peripheral wall 21A of the bus bar housing portion 21 on the terminal holding portion 22 side, and this opening portion is in communication with the terminal holding portion 22.

The terminal holding portion 22 is shaped as a groove, and is provided with a pair of terminal retaining pieces 23 that press the detection terminal 17 from above to retain it. Also, the terminal holding portion 22 is provided with a pair of electrical wire retaining pieces 24 that retain the electrical wires 38. An opening is formed in the wall portion of the terminal holding portion 22 on the electrical wire holding portion 26 side, and this opening portion is an electrical wire introduction portion 25 through which the electrical wire 38 is introduced to the electrical wire holding portion 26.

Bus Bar 15

The bus bar 15 is obtained by pressing a metal plate member into a predetermined shape. Any metal such as copper, a copper alloy, iron, an iron alloy, aluminum, or an aluminum alloy can be appropriately selected for the metal plate member as necessary. The bus bar 15 is shaped to be elongated in the left-right direction when viewed from above. The bus bar 15 is provided with a through-hole 16 that passes through the bus bar 15, and the through-hole 16 is for insertion of a bolt (not shown). When a bolt is inserted through the through-hole 16, and the bolt (not shown) is screwed to the electrode terminal, which is provided with a threaded hole, the electrode terminal and the bus bar 15 are electrically connected.

Detection Terminal 17

The detection terminal 17 for detecting the voltage of the power storage element 11 is placed on the bus bar 15. The detection terminal 17 is obtained by pressing a metal plate member into a predetermined shape. Any metal such as copper, a copper alloy, iron, an iron alloy, aluminum, or an aluminum alloy can be appropriately selected for the metal plate member as necessary. The detection terminal 17 includes a plate-shaped electrode connection portion 18, and a barrel portion 19 that extends from the electrode connection portion 18.

A through-hole 18A for insertion of a bolt is formed in the electrode connection portion 18. The detection terminal 17 is electrically connected to one of two adjacent electrode terminals that are connected by the bus bar 15, by being sandwiched between the head portion of the bolt and the bus bar 15.

The barrel portion 19 is crimped to one end portion of the electrical wire 38 for voltage detection. The other end portion of the electrical wire 38 is connected to an external connection device (not shown) such as an ECU. The barrel portion 19 extends laterally from the electrode connection portion 18.

Note that an ECU is provided with a microcomputer, elements, and the like, and has a known configuration including functions for detecting the voltage, current, temperature, and the like of the power storage elements 11, and for controlling charging and discharging of the power storage elements 11, for example.

Electrical Wire Holding Portion 26

The electrical wire holding portion 26 includes a pair of side wall portions 26A and 26B that are arranged along the alignment direction of the power storage elements 11 (left-right direction in FIG. 1), and a bottom wall portion 26C that connects the pair of side wall portions 26A and 26B. The electrical wires 38 are placed on the bottom wall portion 26C. Electrical wire pressing pieces 27 that extend in a direction that intersects the routing direction of the electrical wires 38 are arranged between the pair of side wall portions 26A and 26B, and prevent the electrical wires 38 from popping up.

The electrical wire pressing pieces 27 each extend from the upper end of the one side wall portion 26A (the side wall portion 26A arranged on the upper side in FIG. 1) via a hinge 27A, and are locked by a pressing piece locking portion 28 provided on the other side wall portion 26B (the side wall portion 26B arranged on the lower side in FIG. 1).

An end portion of the bottom wall portion 26C of the electrical wire holding portion 26 (the right end portion of the bottom wall portion 26C) is connected to a bending member 30 via a hinge 31 (one example of a bending portion).

A support portion 29, which supports the bending member 30 when bent to protrude downward as shown in FIG. 3, is provided below the electrical wire holding portion 26 of the insulating protector 20. A pair of locking pieces 29A that lock the bending member 30 are provided on the support portion 29 as protrusions extending in the rightward direction. A locking claw 29B is provided at the tip of each of the locking pieces 29A.

Bending Member 30

The bending member 30 and the insulating protector 20 are an integrated body, and the bending member 30 is also made of an insulating synthetic resin material. The bending member 30 is provided at a position connected to the electrical wire holding portion 26, and has the hinge 31 (one example of a bending portion) that is bent in a direction that intersects the electrical wire holding portion 26, and the electrical wires 38 are fixed to the bending member 30.

The bending member 30 has a platform portion 32 that is connected to the bottom wall portion 26C of the electrical wire holding portion 26 and is for placement of the electrical wires 38, and locked portions 33 that are provided on respective side edges of the placement portion 32 and are locked to the insulating protector 20 in the bent state. The locked portions 33 protrude outward from the side edges of the platform portion 32, and include elliptical locking holes 33A that can receive the locking claws 29B of the insulating protector 20.

The bending member 30 also includes a fixing member 35 (one example of a fixing portion) that fixes the electrical wires 38 to the bending member 30. The fixing member 35 is a band-shaped member that is separate from the bending member 30. The fixing member 35 is made of a material such as a synthetic resin or a metal, according to need. The fixing member 35 is inserted through a fixing member insertion hole 34 that is provided at a position adjacent to the locked portion 33 arranged on the lower side in FIG. 5. Multiple electrical wires 38 are bundled together by the fixing member 35 inserted through the fixing member insertion hole 34, and thus the electrical wires 38 are fixed to the bending member 30.

Method for Producing Wiring Module 10

Next, a method for producing the wiring module 10 of the present embodiment will be described. The barrel portions 19 of the detection terminals 17 are crimped around exposed conductors at the ends of the electrical wires 38.

The bus bars 15 are inserted into and held by the bus bar housing portions 21 of the insulating protector 20, and then the detection terminals 17 are attached at predetermined locations. The detection terminals 17 are then arranged such that the through-holes 18A of the electrode connection portions 18 of the detection terminals 17 are placed on the through-holes 16 of the bus bars 15, and such that the barrel portions 19 of the detection terminals 17 are arranged in the terminal holding portions 22. Accordingly, the detection terminals 17 are retained by the terminal retaining pieces 23 and the electrical wire retaining pieces 24 provided on the terminal holding portion 22, and the electrical wires 38 are guided from the electrical wire introduction portions 25 to the electrical wire holding portion 26.

Figure 5:
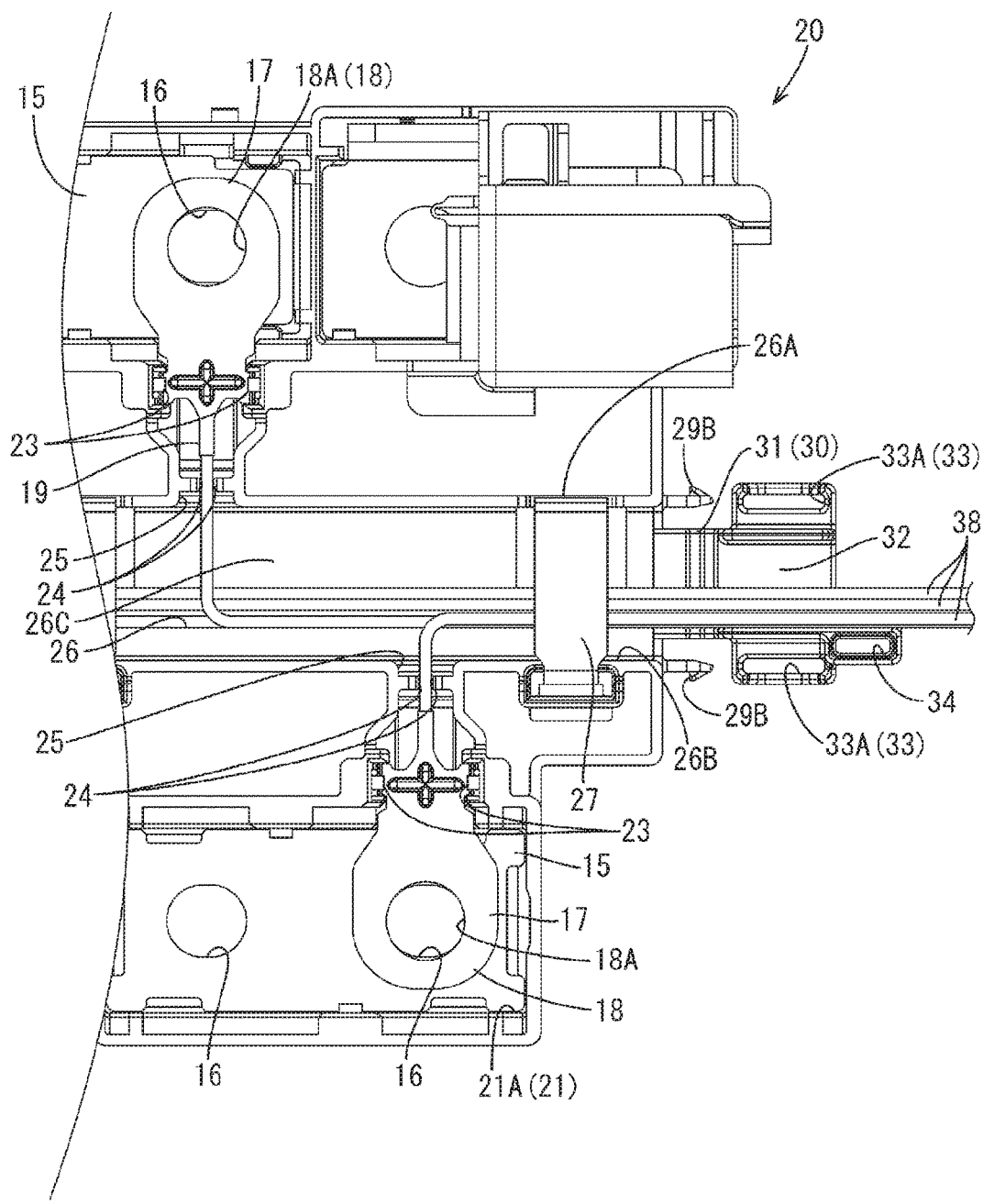
FIG. 5 is a partial plan view of the wiring module before execution of a fixing step.
Figure 6:
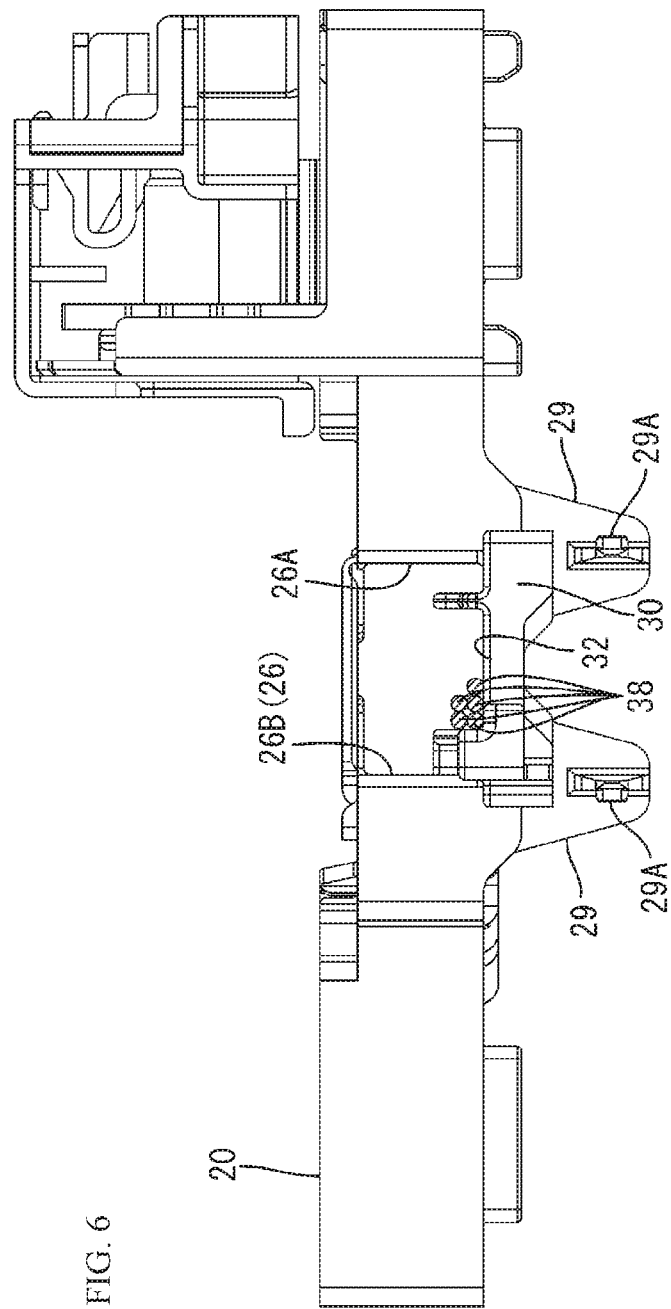
FIG. 6 is a partial side view of the wiring module before execution of the fixing step.
Figure 7:
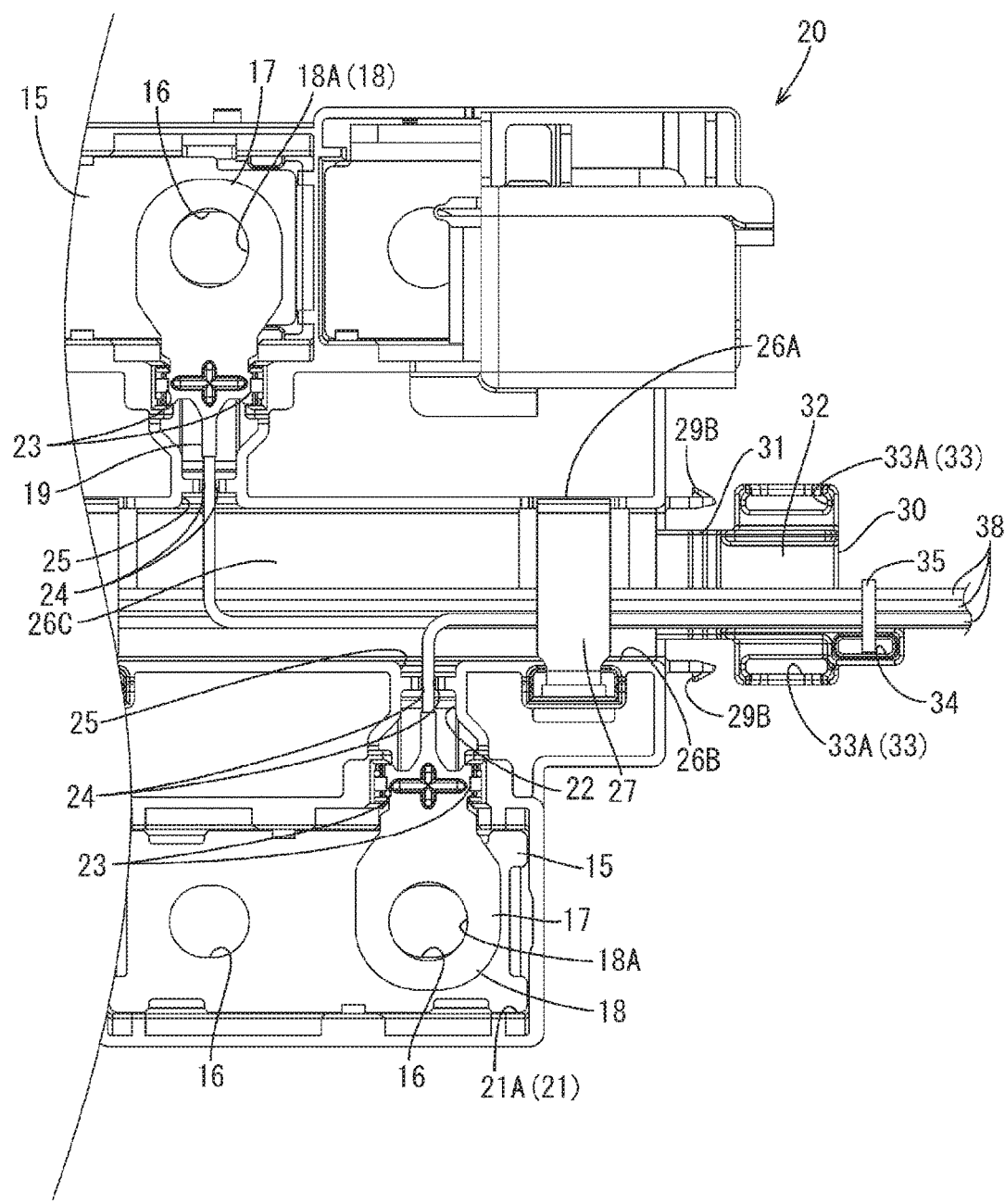
FIG. 7 is a partial plan view of the wiring module after execution of the fixing step and before execution of a bending step.
Figure 8:
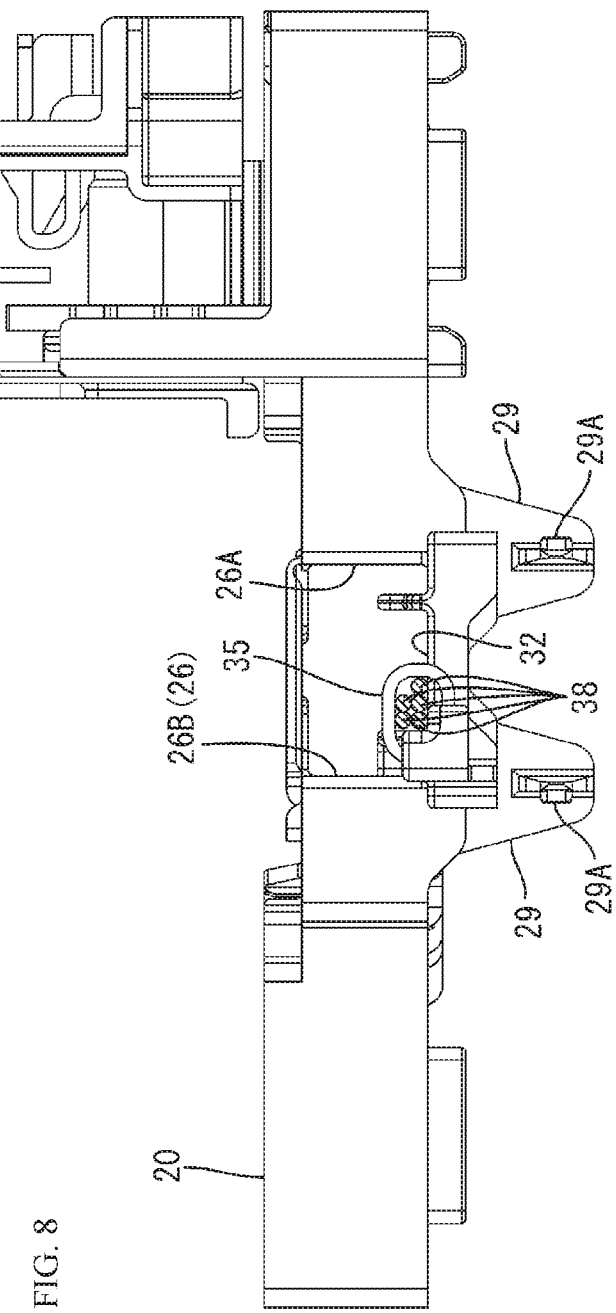
FIG. 8 is a partial side view of the wiring module after execution of the fixing step and before execution of the bending step.

All of the bus bars 15 and the detection terminals 17 are attached to the insulating protector 20, and the electrical wires 38 are placed in the electrical wire holding portion 26 in this way to assemble the wiring module 10 as shown in FIGS. 5 and 6, and thereafter a fixing step of fixing the electrical wires 38, which are held by the electrical wire holding portion 26, to the bending member 30 is executed. Specifically, the fixing member 35 is inserted through the fixing member insertion hole 34 so as to bundle together a predetermined number of electrical wires 38, and thus the electrical wires 38 are fixed to the bending member 30 as shown in FIGS. 7 and 8.

Figure 4:
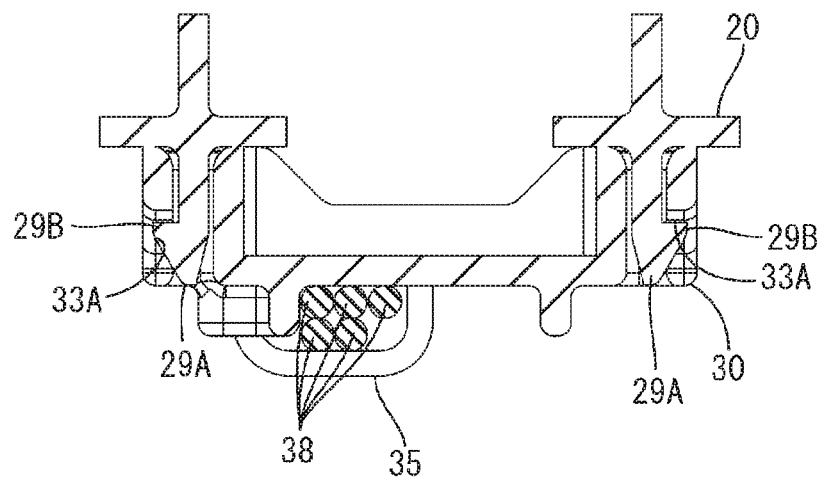
FIG. 4 is a cross-sectional view taken along line A-A in FIG. 3.

Next, a bending step is executed by bending the bending member 30 at the hinge 31 approximately 90° downward relative to the bottom wall portion 26C of the electrical wire holding portion 26 (bending the bending member 30 in a direction that intersects the electrical wire holding portion 26). The electrical wires 38 are fixed to the bending member 30 at this time, and therefore are bent downward approximately 90° along with the bending member 30. Next, a locking step is executed in order to lock the bending member 30, which is in the bent state due to executing the bending step, to the insulating protector 20. The bending member 30 is locked to the insulating protector 20 by fitting the locking claws 29B provided on the insulating protector 20 into the locking holes 33A of the bending member 30. Accordingly, as shown in FIGS. 2 to 4, the electrical wires 38 are locked to the insulating protector 20 in the state of being bent downward approximately 90° relative to the bottom wall portion 26C of the electrical wire holding portion 26 along with the bending member 30, thus obtaining the wiring module 10 of the present embodiment.

Method for Assembling Power Storage Module M

The power storage element group 12 is produced by arranging multiple power storage elements 11 side by side such that adjacent electrode terminals of the power storage elements 11 have opposite polarities. The wiring module 10 produced as described above is then attached to the top of the power storage element group 12, and the electrode terminals of the power storage elements 11 and the bus bars 15 are electrically connected by bolt fastening, thus obtaining the power storage module M.

Actions and Effects of Present Embodiment

Next, actions and effects of the present embodiment will be described.

In the present embodiment, the electrical wires 38 held in the electrical wire holding portion 26 are fixed to the bending member 30, and the bending member 30 with the electrical wires 38 fixed thereto is bent at the hinge 31 so as to be in the bent state and be locked to the insulating protector 20. Specifically, in the present embodiment, by merely fixing the electrical wires 38, which are held in the electrical wire holding portion 26, to the bending member 30, and then bending the bending member 30 at the hinge 31, it is possible to change the routing direction of the electrical wires 38 to a direction that intersects the direction in which they are routed in the electrical wire holding portion 26, and therefore it is possible to smoothly perform assembly work even in the case where the routing direction of. the electrical wires 38 needs to be changed. As a result, according to the present embodiment, it is possible to provide the wiring module 10 having improved workability in assembly work.

Also, according to the present embodiment, the bending member 30 and the insulating protector 20 are an integrated body, and therefore it is possible to mold the bending member 30 and the insulating protector 20 at the same time, and it is possible to simplify the production process.

Also, according to the present embodiment, the bending member 30 includes the fixing member 35 for fixing the electrical wires 38 to the bending member 30, and therefore it is possible to smoothly perform the work of changing the routing direction of the electrical wires 38, thus achieving superior work efficiency.

Other Embodiments

The technology disclosed in this specification is not limited to the embodiment described above using the foregoing description and drawings, and embodiments such as the following are also possible.

(1) Although the example where the bending member 30 and the insulating protector 20 are an integrated body is described in the above embodiment, they may be separate bodies.

(2) Although the example where the band-shaped fixing member 35 that fixes the electrical wires 38 to the bending member 30 is a separate body is described in the above embodiment, a belt or the like that is integrated with the bending member may be provided as the fixing portion.

(3) Although the example where the bending member 30 is bent at the hinge 31 downward approximately 90° relative to the bottom wall portion 26C of the electrical wire holding portion 26 is described in the above embodiment, the angle and the direction are not limited in this way. For example, a configuration is possible in which the bending member is bent upward approximately 90° relative to the bottom wall portion of the electrical wire holding portion.

(4) Although secondary cells are described as the power storage elements 11 in the above embodiment, the power storage elements may be capacitors or condensers.

REFERENCE SIGNS LIST

10 Wiring module
11 Power storage element
12 Power storage element group
17 Detection terminal
20 Insulating protector
26 Electrical wire holding portion
26A, 26B Side wall portion
26C Bottom wall portion
27 Electrical wire pressing piece
29 Support portion
29B Locking claw (locking portion)
30 Bending member
31 Hinge (bending portion)
32 Platform portion
33 Locked portion
33A Locking hole
34 Fixing member insertion hole
35 Fixing member (fixing portion)
38 Electrical wire

The invention claimed is:

1. A wiring module configured for attachment to a power storage element group in which multiple power storage elements are arranged in a line, the wiring module comprising:
   an insulating protector having an electrical wire holding portion that holds an electrical wire that detects a condition of the power storage elements; and
   a bending member that is connected to the electrical wire holding portion, and has a bending portion that is bent in a direction which intersects the electrical wire holding portion and changes a routing direction of the electrical wire held in the electrical wire holding portion, the electrical wires being fixed to the bending member,
   wherein the bending member has a locked portion that is locked to the insulating protector in a condition bent by the bending portion.

2. The wiring module according to claim 1,
   wherein the bending member and the insulating protector are an integrated body.

3. The wiring module according to claim 2,
   wherein the bending member includes a fixing portion that fixes the electrical wire to the bending member.

4. The wiring module according to claim 1,
   wherein the bending member includes a fixing portion that fixes the electrical wire to the bending member.

5. The wiring module according to claim 1, wherein the locked portion comprises a locking claw and a corresponding locking hole that receives the locking claw.

6. A method for producing a wiring module configured for attachment to a power storage element group in which multiple power storage elements are arranged in a line, the wiring module comprising an insulating protector having an electrical wire holding portion that holds an electrical wire that detects a condition of the power storage elements, and a bending member that is connected to the electrical wire holding portion, and has a bending portion that is bent in a direction which intersects the electrical wire holding portion and changes a routing direction of the electrical wire held in the electrical wire holding portion, the electrical wires being fixed to the bending member, the method comprising:
   fixing the electrical wire held in the electrical wire holding portion to the bending member; thereafter
   bending the bending portion; and
   locking the bending member to the insulating protector, the bending member being in a bent condition due to bending the bending portion.

7. The method for producing a wiring module according to claim 6, further comprising:
   providing a locked portion having a locking claw and a corresponding locking hole that receives the locking claw, and
   locking the bending member to the insulating protector via the locking claw and corresponding locking hole.

* * * * *